UNITED STATES PATENT OFFICE 2,687,961

PROCESS OF TREATING FOWL

Eugene D. Ellis, Miami, Fla., assignor to International Minerals & Chemical Corporation, a corporation of New York No Drawing. Application August 29, 1950, Serial No. 182,147

7 Claims. (Cl. 99—107)

This invention relates to a process which brings out existing flavor in food products, and more particularly relates to the preservation and enhancement of natural flavors in food products. Still more particularly, it relates to a method of fixing alkali metal salts of L-glutamic acid within the flesh of fowl.

Heretofore, numerous methods of seasoning fowl and poultry with, for example, monosodium glutamate or glutamic acid salts have been used. These methods vary from the sprinkling and rubbing of the seasoning in powder form, on the surface of the food, to the soaking of fowl in simple monosodium glutamate solutions or the injection of aqueous solutions of the salt into the flesh of the fowl through suitable needles or syringes.

Each of the methods has had one or more disadvantages. For example, application of uniform quantities of powder to the food surfaces is difficult to obtain whether the application is by hand or by mechanical dusting. In addition, seasoning applied to the surface of fowl fails to penetrate uniformly or to an appreciable depth.

On the other hand, while injection of liquid solutions effects greater uniformity of penetration and permits reasonable control over quantities of substances injected, the injection system has not been commercially acceptable because pockets of simple monosodium glutamate solutions appear just under the surface of the skin, detracting from the appearance of the fowl. In addition, injected solutions have a definite tendency to avoid absorption and to weep or to bleed from the flesh, causing loss of monosodium glutamate during storage.

It is, therefore, an object of the present invention to overcome the disadvantages and limitations of the above discussed methods of treating fowl or poultry.

It is also an object of the instant invention to provide a process for the treatment of fowl wherein a uniform distribution of salts of glutamic acid is effected.

It is another object to provide a process for treating fowl adaptable to processing plant technic, through the addition of a single injection step.

It is still another object of the present invention to treat eviscerated or disjointed fowl or poultry so as to obtain improved flavor when cooked, but without the said fowl or poultry losing its eye appeal or customer acceptability.

It is still another object of the present invention to inject eviscerated or disjointed fowl or poultry with flavor-improving compositions, while minimizing the shrinkage or loss of weight of the fowl after treatment.

It is a further object of the invention to improve the flavor characteristics of the eviscerated or disjointed fowl or poultry with flavor-enhancing substances, while injecting the same in aqueous solution into the tissues or flesh of fowl or poultry, and insuring that the said solutions will remain within the flesh, will not bleed or run from the tissue, and will not appear as pockets of solution under the surface skin of the fowl.

It is still another object of the invention to substantially uniformly diffuse aqueous solutions of monosodium glutamate and a gelling agent, or any protective colloid which is edible, into the tissues of fowl or poultry and to permanently set the composition so diffused so that it no longer evidences a tendency to bleed, run, or form pockets to any appreciable extent.

These and other objects of the invention will appear from the following description in which one embodiment of the invention will be set forth in detail.

The process of the present invention comprises the injection, into the uncooked flesh of fowl or poultry, of a liquid containing an edible gelling agent in a concentration sufficient to produce a gel or homogeneous mass upon cooling, and sufficient monoalkali metal salt of glutamic acid to effect substantial enhancement of flavor. The composition at the time of injection is maintained at a moderately superatmospheric temperature. The term "liquid," as used in the above sense, means a composition which will flow under moderate pressure of liquid head or positive pressures of five to twenty-five pounds gauge or higher.

To be effective, the dispersion-solution injection medium, upon cooling to atmospheric temperatures, must set at least to a semisolid mass; in other words, have sufficient gel strength to prevent solution separation which would result in water and monosodium glutamate migrating and bleeding. It will be recognized that atmospheric temperatures vary considerably with locality. By "atmospheric temperature" is meant a temperature in the range of approximately 65° F. to approximately 100° F. On the other hand, by "moderate superatmospheric temperatures" is meant temperatures capable of causing colloidal material to disperse as homogeneous sols; such temperatures generally falling in the range of approximately 100° F. to approximately 200° F. To accomplish this solidification result, it has been discovered that the quantity of edible gelling agent needed is in the range of approximately 0.75% to approximately 3.0% by weight, with amounts generally in the range of approximately 1.1% to approximately 1.4%, and with quantities of approximately 1.2% preferred.

Effective gelling agents are marine algae, such as agar-agar, Irish moss, and the like; extracts from beans, such as carob gum; and protein material, such as gelatin, albumin, casein, and the like.

The quantity of monoalkali metal salt of glutamic acid which will properly and evenly distribute liquid in the flesh of fowl, and at the same time produce the proper flavor enhancement, falls into a well-defined range of approximately 3.5% to approximately 8.0% by weight of the solution. Below 3.5% by weight of the salt, the flavor enhancement becomes rapidly less effective, and solutions tend to bleed and not to be permanently incorporated. Solutions containing an excess of 8.0% glutamic acid salt fail to distribute the salt solution properly in the flesh. From the standpoint of flavor enhancement based upon preference taste-testing, poultry is injected with dispersion-solution containing approximately 4.0% to approximately 5.0% by weight of a salt of glutamic acid.

Typical salts useful for the purpose of this invention are the monoalkali metal salts of glutamic acid, such as the sodium, potassium and ammonium salts; also mixtures thereof, or mixtures of such salts with free glutamic acid. By alkali metal, it is meant to include not only sodium, potassium, and other ions generally recognized as belonging to the class of alkali metal group, but also the ammonium ion as full equivalent.

Distribution of the dispersion-solution is effected by injection in a multiplicity of areas. For example, when processing poultry, the eviscerated and/or disjointed birds are injected once in each thigh, once in each leg, once in each side of the breast, once in each wing, and once in the back. The injection of edible gelling agent-glutamic salt dispersion-solutions is generally limited to quantities which will result in a weight increase for fowl or poultry of approximately 4.0% to approximately 5.0%, although quantities outside this range may be used if desired.

The following description is given with reference to the processing of chickens, by way of example and not as a limitation upon the invention. The process is applicable to various types of poultry such as broilers, fryers, stewing chickens, ducks, geese, turkeys, game, and the like.

Chickens, in accordance with general practice, are killed, scalded, picked, and eviscerated in a processing line operation. Immediately after evisceration the birds are weighed and then chilled in a water bath held at 33° F. for a period of approximately two hours. Birds thus treated gain an average of 6.0% to 8.5% in weight.

When birds are processed in accordance with the process of the instant invention, an injection medium is prepared having the following preferred combination of ingredients: namely, about five pounds of monosodium glutamate and about one and one-quarter pounds of gelatin. These ingredients may be added individually to an aqueous medium, or may be added as a single powder previously prepared to have the proper proportions of ingredients. For example, collagen may be hydrated with hot water and, upon completion of the so-called boiling or cooking, the proper quantity of monoalkali metal salt of glutamic acid dissolved therein. Upon cooling or drying in hot air or upon a drum drier, or the like, the product is ground to a powder of uniform composition. This uniform composition powder may then be shipped to any desired point where poultry are being processed, and the injection medium prepared simply by adding proper quantities of powder to warm water. These materials are added, with strong agitation, to—for example—60 pounds of warm or moderately superatmospheric temperature water until a homogeneous mixture is prepared, and the solution then diluted with additional water until 100 pounds of injection medium is obtained. By this method of preparation, uniform compositions may be prepared for injections having known quantities of various constituents in concentrations permitting direct control over the quantity of ingredients added, at all times.

In the instant process the chickens are killed, scalded, picked, eviscerated, and weighed as in the normal processing operation. Weighed birds are then injected with sufficient gelatin-monosodium glutamate liquid to raise the weight of the bird an average of about 5%. The birds are then placed in a water bath held at approximately 33° F. for chilling. After chilling, the birds may be drained and weighed. Birds thus treated gain an average of approximately 10% to 12% in weight, of which amount approximately 5% to 7%, or about 50% to about 58%, is the increased weight normal to the ice-slush chilling operation following the injection operation. Following weighing, the birds are packed in ice for storage.

When chickens have been processed in accordance with previous methods involving chilling prior to injection of simple solutions of monosodium glutamate, the birds are killed, scalded, picked, eviscerated, and then placed in a water bath maintained at approximately 33° F. for chilling. Upon injecting simple solutions of monosodium glutamate into the cool birds, the birds are packed in ice for storage. These birds develop an undesirable effect within 48 hours; namely, pockets of aqueous solution appear just under the surface of the skin.

*Example*

When preparing chickens in accordance with the instant invention, a number of birds (for example, 100 birds) are killed, scalded, picked, eviscerated, and then chilled in a water bath held at approximately 33° F. for approximately two hours. The chilled birds are then weighed. Following weighing, the birds are injected with a solution prepared as follows: five pounds of monosodium glutamate and one and one-quarter pounds of gelatin are dissolved in 75 pounds of water whose temperature is approximately 125° F. The solution is made up to 100 pounds of solution with additional warm water. Each chicken after weighing is injected, in the nine areas above enumerated, with quantities of solution determined by the weight of the bird, to create approximately 5% gain in weight. Following injection the birds are packed in ice for storage. Further by way of example, 100 chickens when dressed, drawn, and ice-packed weighed 189 pounds. After injection of the above described gelatin-monosodium glutamate dispersion-solution, the birds weighed 199 pounds— a gain of 10 pounds amounting to a percentage gain of approximately 5.3%. The weight of the 100 birds after 48 hours ice-pack storage was 196 pounds. This constitutes a weight loss of three pounds in 48 hours, or a percent loss of approximately 1.6%. The birds thus injected do not develop pockets of solution under the skin and do not disclose any evidence of bleeding during storage.

Another advantage resulting from the introduction of the above injection medium, regardless of whether the introduction is before or after chilling, is the reduced shrinkage in weight during storage. Untreated birds, which gain during ice-slush cooling an average of 7.5% by weight, lose during the first 48 hours of storage approximately 4.13% or 53.5% of the gain during chilling. On the other hand, birds treated in accordance with the instant invention and which gained an average of 10.9% by weight due to the combination of injection gain and cooling weight gain, lost during the first 48 hours of storage 3.05%, or only 27.6% of the gain in weight as compared to 53.5% loss normally.

Having thus fully described and illustrated the character of the invention, what is desired to be secured by Letters Patent is:

1. The process of treating uncooked flesh of fowl which comprises injecting into said flesh an aqueous liquid comprising an edible gelling agent and a monoalkali metal salt of glumatic acid while at a moderate superatmospheric temperature, said gelling agent being present in sufficient concentration to set to at least a semisolid mass upon cooling to atmospheric temperatures.

2. The process of treating uncooked flesh of an eviscerated fowl which comprises injecting into said flesh, at a multiplicity of points, an aqueous liquid comprising an edible gelling agent and a monoalkali metal salt of glutamic acid while at a moderate superatmospheric temperature, said gelling agent being present in sufficient concentration to set to at least a semisolid mass upon cooling to atmospheric temperature.

3. The process of treating uncooked flesh of an eviscerated fowl which comprises injecting into said flesh, at a multiplicity of points, an aqueous liquid comprising an edible gel-forming protein material and a monoalkali metal salt of glutamic acid while at a moderate superatmospheric temperature, said edible protein material being present in sufficient concentration to set to at least a semisolid mass upon cooling to atmospheric temperature.

4. The process of treating uncooked flesh of an eviscerated fowl which comprises injecting into said flesh, at a multiplicity of points, an aqueous liquid comprising gelatin and a monoalkali metal salt of glumatic acid while at a moderate superatmospheric temperature, said gelatin being present in sufficient concentration to set to at least a semisolid mass upon cooling to atmospheric temperature.

5. The process of treating uncooked flesh of an eviscerated fowl which comprises injecting into said flesh, at a multiplicity of points, an aqueous liquid comprising an edible gelling agent and monosodium glutamate while at a moderate superatmospheric temperature, said edible gelling agent being present in sufficient concentration to set to at least a semisolid mass upon cooling to atmospheric temperature.

6. The process of treating uncooked flesh of an eviscerated fowl which comprises injecting into the flesh, at a multiplicity of points, an aqueous liquid comprising an edible gelling agent in the quantity in the range of approximately 0.75% to approximately 3% by weight and monosodium glutamate in the quantity in the range of approximately 3.5% to approximately 8% by weight while at a moderate superatmospheric temperature.

7. The process of treating uncooked flesh of an eviscerated fowl which comprises injecting into said flesh an aqueous liquid comprising approximately 1.2% by weight of gelatin and approximately 5% by weight of monosodium glutamate while said liquid is at a moderate superatmospheric temperature.

References Cited in the file of this patent

UNITED STATES PATENTS

| Number | Name | Date |
|---|---|---|
| 2,054,646 | Allen | Sept. 15, 1936 |
| 2,105,477 | Godfrey | Jan. 18, 1938 |
| 2,128,952 | Mareta | Sept. 6, 1938 |
| 2,162,047 | Allen | June 13, 1939 |
| 2,270,582 | Esselen | Jan. 20, 1942 |
| 2,444,127 | Zublin | June 29, 1948 |

OTHER REFERENCES

"Industrial and Engineering Chemistry," October 1929, pages 984 to 987, inclusive, article entitled "Monosodium Glutamate as a Chemical Condiment."